United States Patent
Jones et al.

(10) Patent No.: US 10,569,525 B2
(45) Date of Patent: Feb. 25, 2020

(54) DIODE LASER FIBER ARRAY FOR POWDER BED FABRICATION OR REPAIR

(71) Applicant: General Electric Company, Schenectady, NY (US)

(72) Inventors: Marshall Gordon Jones, Scotia, NY (US); William Thomas Carter, Galway, NY (US); James William Sears, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/419,657

(22) Filed: May 22, 2019

(65) Prior Publication Data

US 2019/0283392 A1    Sep. 19, 2019

Related U.S. Application Data

(62) Division of application No. 14/106,970, filed on Dec. 16, 2013, now Pat. No. 10,328,685.

(51) Int. Cl.
| | |
|---|---|
| *B33Y 30/00* | (2015.01) |
| *B28B 1/00* | (2006.01) |
(Continued)

(52) U.S. Cl.
CPC ............ *B33Y 30/00* (2014.12); *B22F 3/1055* (2013.01); *B22F 5/009* (2013.01);
(Continued)

(58) Field of Classification Search
CPC .................................................. B33Y 30/00
See application file for complete search history.

(56) References Cited

U.S. PATENT DOCUMENTS

| | | |
|---|---|---|
| 5,508,489 A | 4/1996 | Benda et al. |
| 5,672,464 A | 9/1997 | Nelson |
(Continued)

FOREIGN PATENT DOCUMENTS

| | | |
|---|---|---|
| CN | 159817 A | 3/2005 |
| DE | 199053000 A1 | 5/2001 |
(Continued)

OTHER PUBLICATIONS

Paschotta, Dr. R., "Encyclopedia of laser physics and technology—Laser diodes, semiconductor, gain, index guiding, high power," Retrieved from the Internet URL https://www.rp-photonics.com/laser_diodes.html.

(Continued)

*Primary Examiner* — Larry W Thrower
(74) *Attorney, Agent, or Firm* — Armstrong Teasdale LLP

(57) ABSTRACT

A method of forming a build in a powder bed includes emitting a plurality of laser beams from selected fibers of a diode laser fiber array onto the powder bed, the selected fibers of the array corresponding to a pattern of a layer of the build; and simultaneously melting powder in the powder bed corresponding to the pattern of the layer of the build. An apparatus for forming a build in a powder bed includes a diode laser fiber array including a plurality of diode lasers and a plurality of optical fibers corresponding to the plurality of diode lasers, each optical fiber configured to receive a laser beam from a respective diode laser and configured to emitting the laser beam; a support configured to support a powder bed or a component configured to support the powder bed at a distance from ends of the optical fibers; and a controller configured to control the diode laser fiber array to emit a plurality of laser beams from selected fibers of the diode laser fiber array onto the powder bed, the selected fibers of the array corresponding to a pattern of a layer of the (Continued)

Figure 1A:
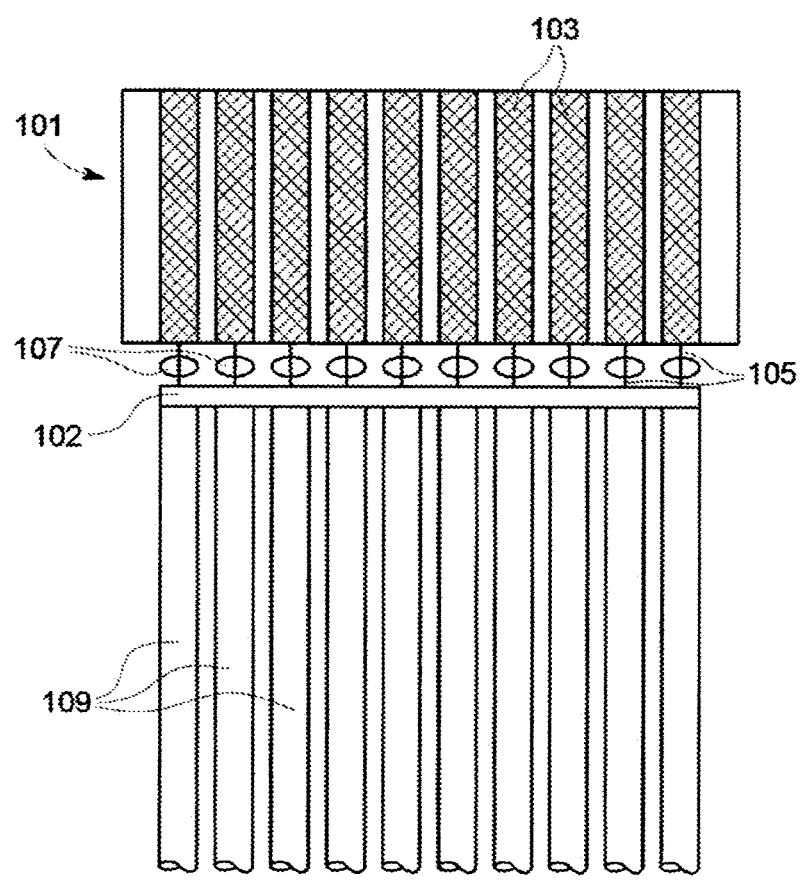

build and simultaneously melt the powder in the powder bed corresponding to the pattern of the layer of the build.

17 Claims, 5 Drawing Sheets

(51) Int. Cl.

| | | |
|---|---|---|
| B29C 73/00 | (2006.01) | |
| B23K 26/06 | (2014.01) | |
| B33Y 10/00 | (2015.01) | |
| B22F 3/105 | (2006.01) | |
| B23K 26/073 | (2006.01) | |
| B23K 26/34 | (2014.01) | |
| B29C 73/34 | (2006.01) | |
| B22F 5/00 | (2006.01) | |
| B29C 64/153 | (2017.01) | |
| B29C 64/20 | (2017.01) | |
| G02B 6/42 | (2006.01) | |
| B29C 64/277 | (2017.01) | |
| B29K 105/00 | (2006.01) | |
| B29L 31/08 | (2006.01) | |
| B23P 6/00 | (2006.01) | |
| B23K 101/00 | (2006.01) | |

(52) U.S. Cl.
CPC ...... *B23K 26/0608* (2013.01); *B23K 26/0626* (2013.01); *B23K 26/073* (2013.01); *B23K 26/34* (2013.01); *B28B 1/001* (2013.01); *B29C 64/153* (2017.08); *B29C 64/20* (2017.08); *B29C 64/277* (2017.08); *B29C 73/00* (2013.01); *B29C 73/34* (2013.01); *B33Y 10/00* (2014.12); *G02B 6/425* (2013.01); *B22F 2003/1056* (2013.01); *B23K 2101/001* (2018.08); *B23P 6/007* (2013.01); *B29K 2105/251* (2013.01); *B29L 2031/08* (2013.01); *F05D 2230/31* (2013.01); *G02B 6/4206* (2013.01); *Y02P 10/295* (2015.11)

(56) References Cited

U.S. PATENT DOCUMENTS

| | | |
|---|---|---|
| 6,180,050 B1 | 1/2001 | Arai et al. |
| 6,292,251 B1 | 9/2001 | Holley et al. |
| 6,423,935 B1 | 7/2002 | Hackel et al. |
| 6,717,106 B2 | 4/2004 | Nagano et al. |
| 6,894,712 B2 | 5/2005 | Ishikawa et al. |
| 6,980,321 B2 | 12/2005 | Ramanujan et al. |
| 7,444,046 B2 | 10/2008 | Karlsen |
| 7,550,251 B2 | 6/2009 | McLean et al. |
| 8,509,933 B2 | 8/2013 | Steingart et al. |
| 2002/0090313 A1 | 7/2002 | Wang et al. |
| 2002/0149137 A1 | 10/2002 | Jang et al. |
| 2003/0214571 A1 | 11/2003 | Ishikawa et al. |
| 2007/0283786 A1 | 12/2007 | Kappmeyer |
| 2013/0136868 A1 | 5/2013 | Bruck et al. |
| 2015/0233345 A1 | 8/2015 | Olsen et al. |
| 2016/0008922 A1 | 1/2016 | Schwarze |

FOREIGN PATENT DOCUMENTS

| | | |
|---|---|---|
| EP | 0740976 A1 | 11/1996 |
| GB | 2453945 A | 4/2009 |
| WO | 2013128416 A2 | 9/2013 |
| WO | 2015109102 A1 | 7/2015 |
| WO | 2016201309 A1 | 12/2016 |

OTHER PUBLICATIONS

Zhao, X. et al., "Influence of directional solidification variables on the microstructure and crystal orientation of AM3 under high thermal gradient," Journal of Material Science, vol. 45, Issue 22, pp. 6101-6107 (2010).

Office Action issued in connection with corresponding CA application No. 2932620 dated Apr. 10, 2017.

Notification of Reasons for Refusal issued in connection with corresponding JP application No. 2016-537994 dated Jun. 6, 2017.

Extended European Search Report and Opinion issued in connection with related EP application No. 17153923.2 dated Jun. 8, 2017.

International Search Report and Written Opinion of the International Searching Authority of corresponding application PCT/US2014/068979.

DIODE LASER FIBER ARRAY FOR POWDER BED FABRICATION OR REPAIR

CROSS REFERENCE TO RELATED APPLICATIONS

This application is a divisional of U.S. patent application Ser. No. 14/106,970, filed Dec. 16, 2013, which is incorporated herein by reference in its entirety.

BACKGROUND

The present technology relates generally to the use of a diode laser fiber array for Direct Metal Laser Melting (DMLM) for use in the fabrication or repair of components, more particularly components of a gas turbine engine.

Additive manufacturing is a known technology that enables the "3D-printing" of components of various materials including metals, ceramics and plastics. In additive manufacturing, a part is built in a layer-by-layer manner by leveling metal powder and selectively fusing the powder using a high-power laser or electron beam. After each layer, more powder is added and the laser forms the next layer, simultaneously fusing it to the prior layers to fabricate a complete component buried in a powder bed. Additive manufacturing systems and processes are used to fabricate precision three-dimensional components from a digital model.

In making a build in current powder bed systems, the laser beam or electron beam is used to scan a layer of powder to sinter and melt the desired shape in the layers of the powder bed. The typical scanning time for such systems per layer is in the range of 70-100 seconds. For some applications, the build can require days of processing time. One application of DMLM is in the fabrication and repair of airfoils for gas turbine engines for aircraft. The geometries of the airfoils are difficult to form using conventional casting technologies, thus fabrication of the airfoils using a DMLM process or an electron-beam melting process has been proposed. With the layers built upon one another and joined to one another cross-section by cross-section, an airfoil or portion thereof, such as for a repair, with the required geometries, may be produced. The airfoil may require post-processing to provide desired structural characteristics.

Another problem of laser scanning Direct Metal Laser Melting (DMLM) systems is rapid cooling rates that can lead to cracking of certain alloys during the additive manufacturing build process. Rapid cooling rates also present difficulties in obtaining desirable grain growth, for example grain growth that is normal to the layer surface.

BRIEF DESCRIPTION

In accordance with one example of the technology disclosed herein, a method of forming a build in a powder bed comprises emitting a plurality of laser beams from selected fibers of a diode laser fiber array onto the powder bed, the selected fibers of the array corresponding to a pattern of a layer of the build; and simultaneously melting powder in the powder bed corresponding to the pattern of the layer of the build.

In accordance with another example of the technology disclosed herein, an apparatus for forming a build in a powder bed comprises a diode laser fiber array comprising a plurality of diode lasers and a plurality of optical fibers corresponding to the plurality of diode lasers, each optical fiber configured to receive a laser beam from a respective diode laser and configured to emitting the laser beam; a support configured to support a powder bed or a component configured to support the powder bed at some working distance from ends of the optical fibers; and a controller configured to control the diode laser fiber array to emit a plurality of laser beams from selected fibers of the diode laser fiber array onto the powder bed, the selected fibers of the array corresponding to a pattern of a layer of the build and simultaneously melt the powder in the powder bed corresponding to the pattern of the layer of the build.

DRAWINGS

Figure 1B:
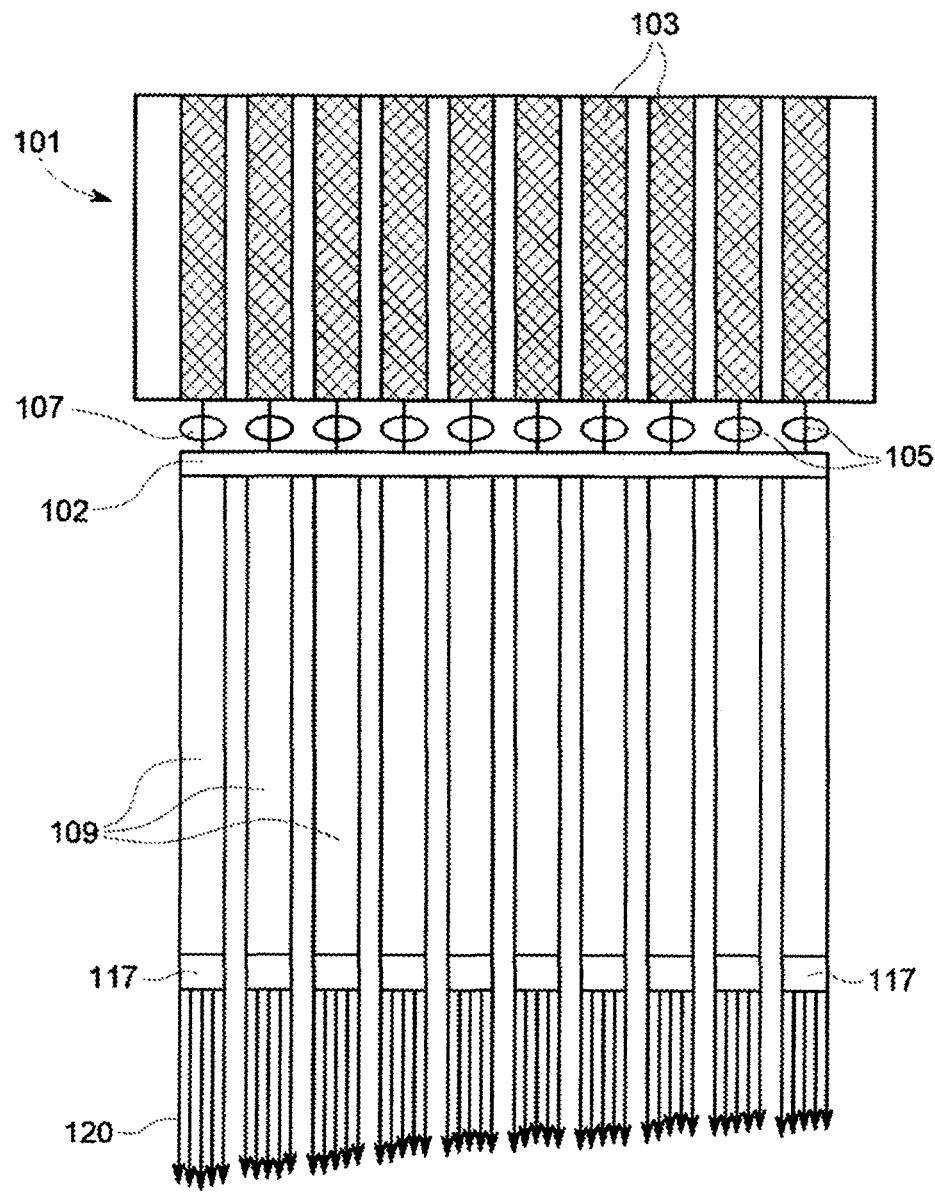
Figure 1C:
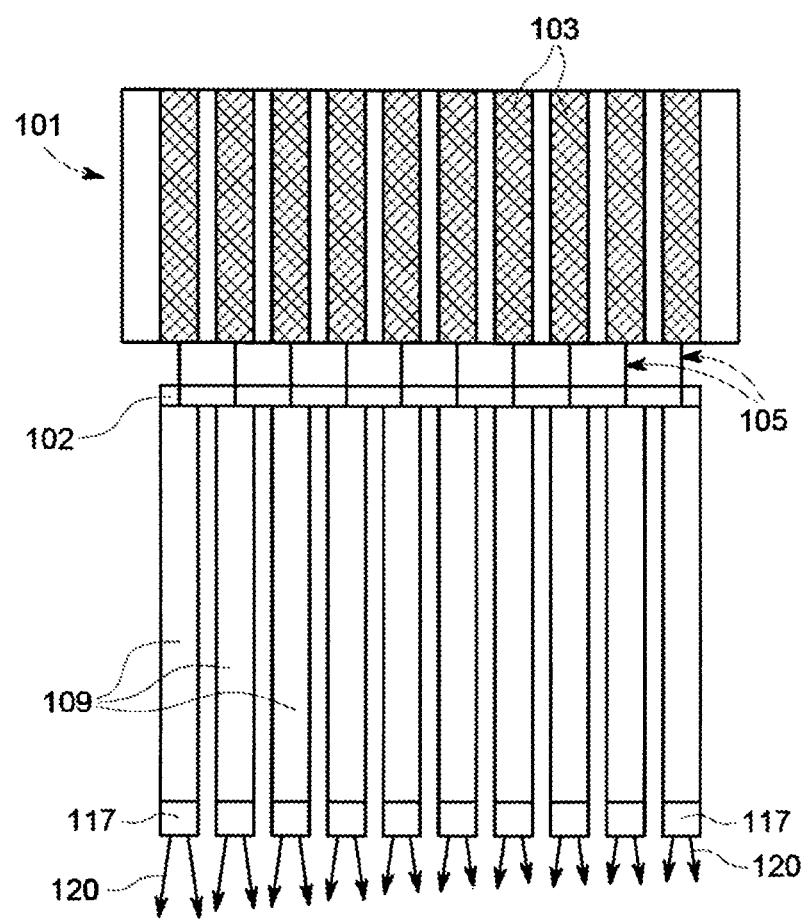
Figure 2:
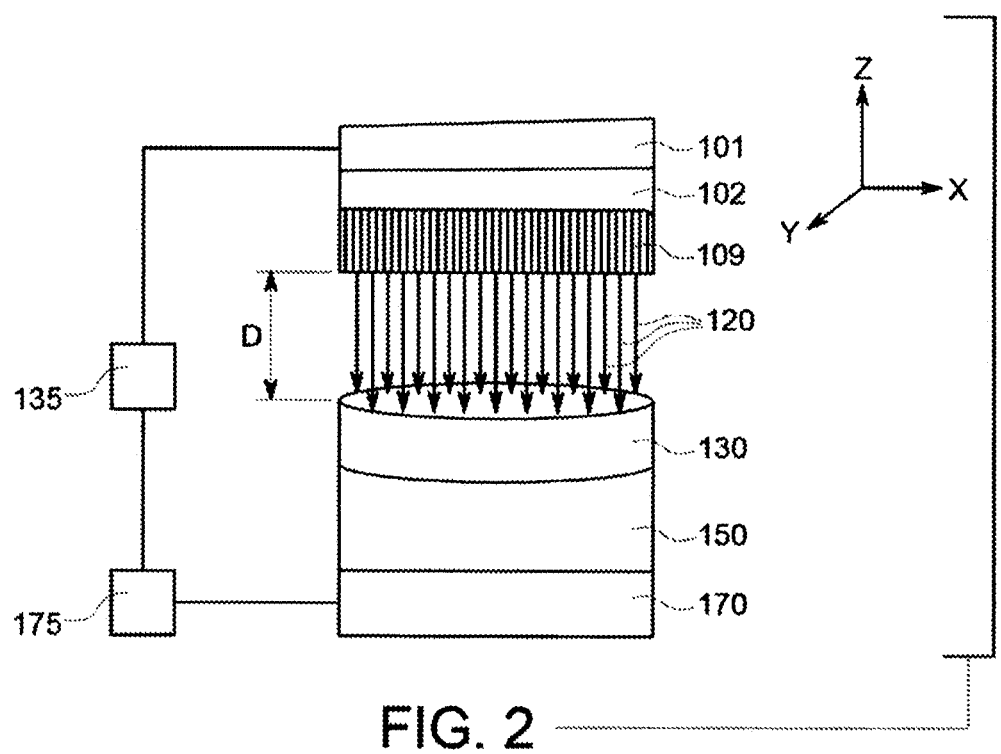
Figure 3:
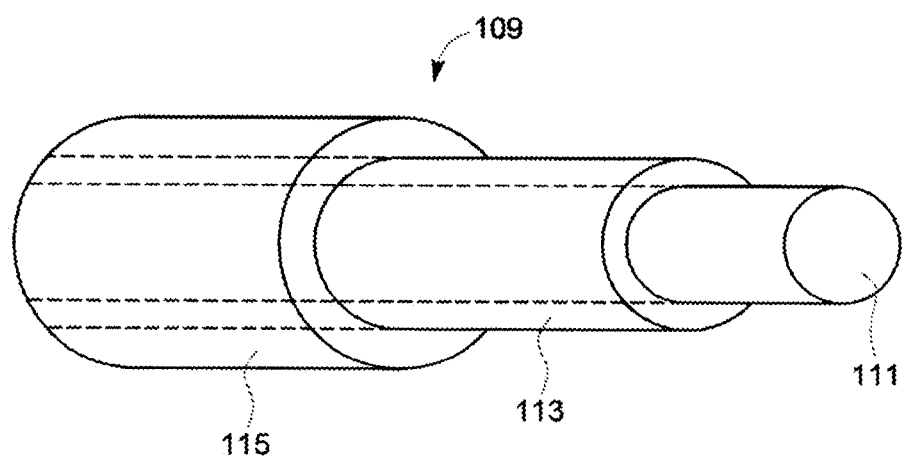
Figure 4A:
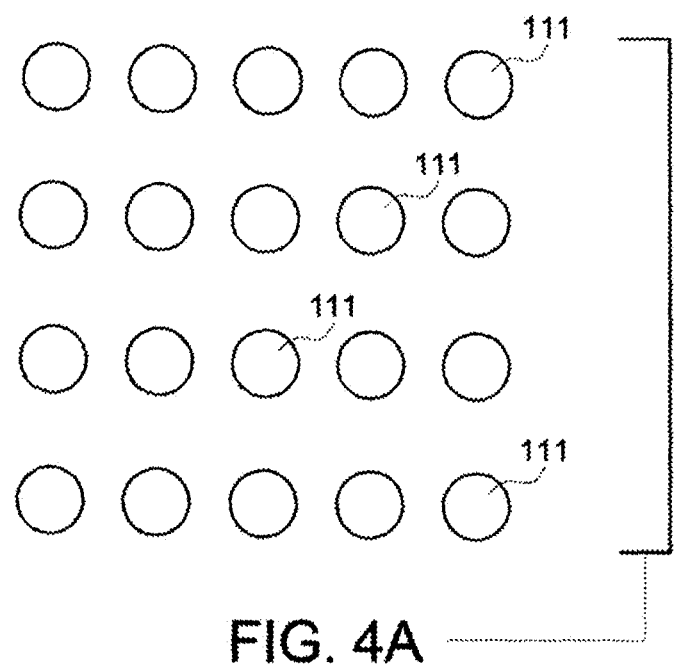
Figure 4B:
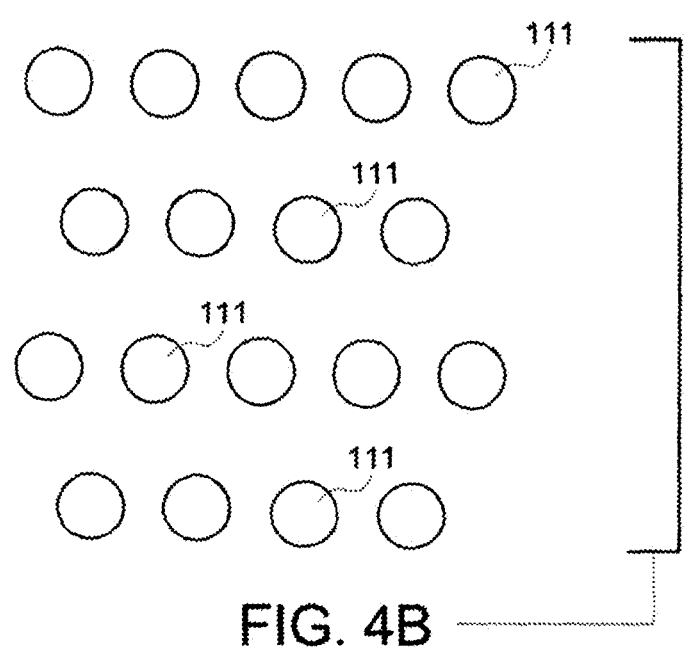

These and other features, aspects, and advantages of the present technology will become better understood when the following detailed description is read with reference to the accompanying drawings in which like characters represent like parts throughout the drawings, wherein:

FIG. 1A schematically illustrates a diode laser fiber array for use with the present technology;

FIG. 1B schematically illustrates another diode laser fiber array for use with the present technology;

FIG. 1C schematically illustrates another diode laser fiber array for use with the present technology;

FIG. 2 schematically illustrates a system for simultaneous melting of a powder bed layer by a diode laser fiber array according to an example of the present technology;

FIG. 3 schematically illustrates a fiber optic construction usable in a diode laser fiber array according to an example of the present technology;

FIG. 4A schematically illustrates a fiber array usable with the system according to the present technology; and FIG. 4B schematically illustrates another fiber array usable with the system according to the present technology.

DETAILED DESCRIPTION

Referring to FIG. 1A, a diode laser array 101 (e.g., a diode laser bar or stack) includes a plurality of diode lasers, or emitters, 103, each emitting a beam of radiation 105. A plurality of cylindrical lenses 107 are positioned between the diode lasers 103 and a plurality of optical fibers 109 to couple each diode laser 103 to an optical fiber 109. The optical fibers 109 may be provided in a bundle 102 between the diode laser array and the free ends of the optical fibers, as shown for example in FIGS. 1A-1C. However, it should be appreciated that diode fiber laser arrays that do not use coupling optics may be used with the present technology, as discussed below.

Referring to FIG. 1B, the diode laser fiber array 101 may include lenses 117 at the ends of the optical fibers 109. The lenses 117 may be configured to provide collimated laser beams 120 from the optical fibers 109. Referring to FIG. 1C, the diode laser fiber array 101 may not include optics (e.g. a lens) between the diode lasers 103 and the optical fibers 109 and the beams of radiation 105 may be received by the optical fibers 109 in proximity to the diode lasers 103. The optical fibers 109 may have lenses 117 at their respective ends. The lenses 117 may be configured to provide a predetermined divergence to the laser beams 120 emitted from the optical fibers 109. It should also be appreciated that instead of providing lenses that the ends of the optical fibers 109 may be shaped to provide collimated or divergent laser beams 120.

Referring to FIG. 2, the diode laser fiber array 101 directs laser beams 120 from the optical fibers 109 into a powder bed 130 to simultaneously melt all of the desired powder in a layer. To generate a desired pattern, for example of a repair or a component to be fabricated, the required diode lasers 103 are turned on to affect the desired simultaneous melting from each fiber 109. The melting process time for the desired pattern may be less than a second, which is at least two orders of magnitude faster than current scanning processes.

The powder bed 130 may be provided on a component 150, for example an airfoil of a gas turbine engine of an aircraft, which is supported on a support 170 to provide a repair to the component. Although the present technology may be applicable to the repair function on components, it should be appreciated that the present technology is applicable for the additive manufacturing build of new make components. The powder bed may be provided on the support 170 and the diode laser fiber array 101 used to build or fabricate the component layer by layer.

The support 170 may be moved by an actuator or an actuator system 175 that is configured to move the support 170 in the Z direction (i.e. normal to the powder bed 130) as shown in FIG. 2. The actuator or actuator system 175 may also be configured to move the support 170 in the XY plane as shown in FIG. 2, although the support 170 is not moved in the XY plane during simultaneous melting of the powder bed from each fiber 109. The actuator or actuator system 175 may be controlled by controller 135 that is configured to control the actuator or actuator system 175 and the diode laser fiber array 101. The actuator or actuator system 175 may include, for example, a linear motor(s) and/or hydraulic and/or pneumatic piston(s) and/or a screw drive mechanism(s) and/or a conveyor. As the diode laser fiber array 101 is capable of simultaneously melting all of the required powder in the layer for a pattern, there is no need to move either the array 101 or the powder bed 130 during melting, for example as is done with current systems in which a laser beam or electron beam is used to scan a layer of powder.

The distance D between the array of optical fibers 109 (i.e. the ends of the optical fibers 109) and the powder bed 130 may be controlled by moving the support 170 in the Z direction. The distance D may depend on the type of laser beams 120 emitted by the optical fibers 109 (e.g. whether the laser beams 120 are collimated or divergent, and the amount of divergence), the average output power of each diode laser 103, the pulse energy of each diode laser 103, the pulse width of each diode laser 103, and or the beam distribution (e.g. Gaussian, top hat, etc.). The ends of the optical fibers 109 may be located at, for example, about 5 mm to about 150 mm, for example about 20 mm to about 80 mm above the powder bed 130 so that any region of a layer of the powder bed 130 can be melted at the same time by turning the required diode lasers 103 on at the same time.

The controller 135 controls the turning on and turning off of each diode laser 103. The controller may also control the rate at which the power of each diode laser 103 is reduced when turned off. The controller 135 may turn each diode laser 103 on and off within a time frame of, for example, about 5 to 15 milliseconds, or longer if needed. For a given layer of powder 130, for example above an airfoil to be repaired, the desired laser diodes 103 are activated to melt the powder in the desired shape per a CAD design, which may be input and/or stored in the controller 135. This process may be repeated as many times as necessary to build up the required repair region. In the case of the system being used to fabricate a component, e.g. an airfoil, the process is repeated as many times as necessary to build the component. The controller 135 controls the actuator or actuator 175 to move the support 170 downwardly as layers of powder are added and subsequently processed by the diode laser fiber array. Each layer formed may be, for example, about 1 μm to about 1 mm thick. In the case of repair of an airfoil, each layer may be formed, for example, about 100 μm thick.

The controller 135 may be a computer processor or other logic-based device, software components (e.g., software applications), and/or a combination of hardware components and software components (e.g., a computer processor or other logic-based device and associated software application, a computer processor, or other logic-based device having hard-wired control instructions, or the like).

The diode laser fiber array 101 may be controlled by the controller 135 to control the heat of powder near or adjacent to the melted region to control the cooling rate of the melted region. The controller 135 may also control the diode laser fiber array 101 to preheat the powder bed 130 and/or the component 150. The pre-heating power densities of the diode lasers 103 may be from about 100-100,000 watts/cm$^2$. By pre-heating the powder bed 130 and/or the component 150 and/or heating the region near or adjacent to the melt region, the thermal gradient may be controlled to be substantially only in the direction normal to the powder bed (i.e. in the Z direction in FIG. 2). This may help with materials that are crack sensitive to fast solidification cooling rates. Desirable grain growth that's normal to the layer surface may be achievable with planar cooling of a powder bed layer. This allows formation of a directionally solidified (DS) type grain structure and a single crystal structure with the build repair of an airfoil type structure. It should also be appreciated that the diode lasers 103 may be controlled to superheat the powder bed 130 to control the viscosity of the melted region. Controlling the viscosity of the melted region allows control over, for example, evaporation of the powder, the grain structure of the solidified layer, and/or the surface finish of the repair or component.

The material in the powder bed 130 may be metal powder, for example, CoCrMo powder. It should be appreciated that other materials, for example plastic, ceramic, or glass, may be used for the powder bed. Depending on the material in the powder bed, the power of each diode laser 103 may be from about 10 to about 60 watts. The power of the diode lasers 103 that are used may be related to the diameter of the optical fibers 109 used. The power density of the diode lasers 103 may be up to about 1,000,000 watts/cm$^2$ for melting the powder within a layer from each fiber.

The fiber centering position in the fiber array (e.g. as shown in FIGS. 4A and 4B) is set by the diameter of a buffer, or coating 115 of the optical fiber 109. Referring to FIG. 3, the optical fiber 109 comprises a core 111, formed of for example silica, and cladding 113, formed for example of silica, around the core 111. In order to create a numerical aperture and provide total internal reflection within the fiber 109, the refractory index of the silica core may be larger than the refractory index of the silica cladding. For example, the silica core may have a refractive index of about 1.45 and the silica cladding may have a refractive index of about 1.43. The cladding 113 may have a thickness of about 10 μm.

The buffer, or coating, 115 surrounds the cladding 113 and may be formed of, for example, acrylate. To reduce the center spacing between the optical fibers 109, the buffer (acrylate coating) 115 may be replaced by a thinner acrylate coating to reduce the overall fiber diameter. The thickness of the buffer, or coating 115 may be about 62 μm. The total diameter of the fiber 109 may be about 200 μm to about 250 μm.

The diameter of the fiber core 111 may be about 105 μm. It should be appreciated that fiber core diameters of about 60 μm may be used. In addition, it should be appreciated that optical fibers 109 of various cross sections, may be used. For example, square fibers may be used to increase fiber packing. The melt pool size produced by the laser beam(s) 120 from each optical fiber 109 corresponds to the effective laser spot size produced by the laser beam(s) 120. In the case of collimated laser beams 120, the melt pool size corresponds generally to the diameter of the fiber core 111. However, the laser beams 120 from the fibers 109 may be controlled to produce a melt pool size that is, for example, two to four times as large as the diameter of the fiber core 111. The laser beams 120 may be controlled to have a divergence to provide a melt pool size larger than the diameter of the fiber core 111. In the case of divergent laser beams 120, the distance D from the ends of the fibers 109 of the array 101 to the powder bed 130 will also influence the melt pool size of each fiber. The pulse width of the laser beams and the laser beam profiles may also be controlled to adjust the melt pool size provided by each fiber.

Referring to FIGS. 4A and 4B, the array of fibers 109 may be linear as shown in FIG. 4A or closed packed arrangement as shown in FIG. 4B. Other arrays, for example hexagonal, may be used. It should also be appreciated that the array may be in a shape corresponding to the shape of a component to be fabricated. The spacing between the fibers 109 may be equal to the diameter of the buffer, or coating, 115.

The diode laser fiber array of the present technology may be used to process a powder bed layer by exposing the layer with simultaneous laser energy from required diode laser beam sources. The present technology also allows melting the complete pattern in the layer in one time frame that could be less than a second and, when required, control the heat of the powder near and/or adjacent to the melted region to control the cooling rate of the melted region. The diode laser fiber array allows permits grain structure control. The commercial advantages for diode laser fiber array systems include fewer required systems to produce the same amount of parts as current systems and tailoring power bed systems to the size of the parts of interest. The technology disclosed herein may also be used to perform sintering, for example direct metal laser sintering.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is, therefore, to be understood that the appended claims are intended to cover all such modifications and changes.

The invention claimed is:

1. An apparatus for forming a build in a powder bed, comprising:
   a diode laser fiber array comprising a plurality of diode lasers and a plurality of optical fibers corresponding to the plurality of diode lasers, each optical fiber configured to receive a laser beam from a respective diode laser and configured to emit the laser beam;
   a support configured to support a powder bed or a component configured to support the powder bed at a distance from ends of the optical fibers; and
   a controller configured to control the diode laser fiber array to emit a plurality of laser beams from selected fibers of the diode laser fiber array onto the powder bed, the selected fibers of the array corresponding to a pattern of a layer of the build and simultaneously melt the powder in the powder bed corresponding to the pattern of the layer of the build.

2. An apparatus according to claim 1, wherein the controller is further configured to control at least one of a duration of each laser beam, a pulse energy of each diode laser, a pulse width of each diode laser, an average output power of each diode laser, an energy distribution of each laser beam, power density of each laser beam, a rate of reduction of the power of each laser beam, and/or a distance of ends of the fibers from the powder bed.

3. An apparatus according to claim 1, wherein the controller is further to control the diode laser fiber array to emit laser beams from fibers adjacent to the pattern of the layer and heat the powder adjacent to the powder of the layer of the build to control a cooling rate of the melted powder.

4. An apparatus according to claim 3, wherein the controller is configured to control the diode laser fiber array to heat the powder adjacent to the powder of the layer at least one of prior to and/or during simultaneous melting of the powder of the pattern of the layer.

5. An apparatus according to claim 1, wherein the optical fibers are provided in a plurality of linear arrays.

6. An apparatus according to claim 5, wherein the plurality of linear arrays are arranged in closed packed configuration.

7. An apparatus according to claim 1, wherein each optical fiber comprises a core, a cladding surrounding the core, and a buffer surrounding the cladding.

8. An apparatus according to claim 7, wherein the core and the cladding are formed of silica, and a refractive index of the core is larger than a refractive index of the cladding.

9. An apparatus according to claim 8, wherein a diameter of the core is from about 60 μm to about 105 μm.

10. An apparatus according to claim 9, wherein a thickness of the cladding is about 10 μm.

11. An apparatus according to claim 10, wherein the buffer is formed of acrylate or polyimide.

12. An apparatus according to claim 11, wherein a thickness of the buffer is about 62 μm.

13. An apparatus according to claim 7, wherein a diameter of each optical fiber is about 250 μm.

14. An apparatus according to claim 1, wherein the fibers have circular cross sections.

15. An apparatus according to claim 1, further comprising:
   at least one lens, the at least one lens being configured to collimate the laser beams.

16. An apparatus according to claim 1, further comprising:
   at least one lens, the at least one lens being configured to provide a predetermined divergence to each of the laser beams.

17. An apparatus according to claim 1, further comprising:
   an actuator configured to move the support, wherein the controller is configured to control the actuator to adjust the distance between the powder bed and the ends of the optical fibers.

* * * * *